United States Patent
Hwang et al.

(10) Patent No.: US 8,145,803 B2
(45) Date of Patent: Mar. 27, 2012

(54) APPARATUS AND METHOD FOR CREATING MACRO COMMAND

(75) Inventors: In-chul Hwang, Suwon-si (KR); Eun Namgung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/773,375

(22) Filed: May 4, 2010

(65) Prior Publication Data

US 2010/0217407 A1  Aug. 26, 2010

Related U.S. Application Data

(62) Division of application No. 11/938,328, filed on Nov. 12, 2007, now Pat. No. 7,783,367.

(30) Foreign Application Priority Data

Mar. 12, 2007  (KR) .................. 10-2007-0024129

(51) Int. Cl.
*G06F 3/00* (2006.01)
*G05B 11/01* (2006.01)
*G06F 19/00* (2006.01)

(52) U.S. Cl. .................. 710/20; 710/2; 710/21; 700/23; 700/181; 702/119; 702/126

(58) Field of Classification Search .................. 700/23, 700/89, 180–181; 710/2, 20–21; 702/118–119, 702/124, 126, 183; 709/208–210
See application file for complete search history.

(56) References Cited

U.S. PATENT DOCUMENTS

| 5,566,336 | A | 10/1996 | Futatsugi et al. |
| 5,923,612 | A | 7/1999 | Park et al. |
| 6,615,243 | B1 | 9/2003 | Megeid et al. |
| 6,697,754 | B1* | 2/2004 | Alexander ..................... 702/119 |
| 6,724,339 | B2* | 4/2004 | Conway et al. ............... 341/176 |
| 7,155,305 | B2* | 12/2006 | Hayes et al. .................. 700/224 |
| 7,330,174 | B2* | 2/2008 | du Breuil ....................... 345/107 |
| 7,746,245 | B2* | 6/2010 | Park et al. ...................... 340/12.3 |
| 2001/0010503 | A1* | 8/2001 | Darbee et al. ................. 341/176 |
| 2003/0182535 | A1 | 9/2003 | Kadowaki |
| 2004/0189591 | A1* | 9/2004 | Breuil ............................ 345/156 |
| 2004/0263349 | A1* | 12/2004 | Haughawout et al. ... 340/825.72 |

(Continued)

FOREIGN PATENT DOCUMENTS

CN  1265753 A  9/2000

(Continued)

OTHER PUBLICATIONS

Chinese Office Action issued on Feb. 9, 2011 in the corresponding Chinese Patent Application No. 200810082561.5.

*Primary Examiner* — Ramesh Patel

(74) *Attorney, Agent, or Firm* — Sughrue Mion, PLLC

(57) ABSTRACT

Disclosed is provided an apparatus and a method for operating a macro command and inputting a macro command, wherein the apparatus including a storing unit storing control signals received from a control device for selecting of a menu item of a host device, a creating unit creating the macro command combined with the control signals, and an executing unit reading the macro command and executing functions corresponding to the respective menu item of the host device according to a combination sequence of the control signals included in the read macro command.

8 Claims, 10 Drawing Sheets

U.S. PATENT DOCUMENTS

| | | |
|---|---|---|
| 2005/0083137 A1 | 4/2005 | Lee et al. |
| 2005/0110652 A1* | 5/2005 | Becker et al. ............ 340/825.72 |
| 2005/0159823 A1* | 7/2005 | Hayes et al. .................... 700/19 |
| 2005/0231414 A1 | 10/2005 | Chu et al. |
| 2006/0187079 A1* | 8/2006 | Stevenson et al. ....... 340/825.22 |
| 2006/0267741 A1* | 11/2006 | Park et al. ................ 340/310.11 |
| 2007/0169047 A1 | 7/2007 | Na et al. |
| 2007/0174726 A1 | 7/2007 | Nam et al. |
| 2008/0137631 A1* | 6/2008 | de Clerq et al. ............... 370/338 |
| 2008/0201754 A1 | 8/2008 | Arling et al. |
| 2008/0221715 A1* | 9/2008 | Krzyzanowski et al. ....... 700/90 |
| 2008/0238866 A1* | 10/2008 | Saito ............................ 345/107 |
| 2008/0294986 A1 | 11/2008 | Seo et al. |
| 2009/0002219 A1* | 1/2009 | Arling et al. .................. 341/176 |
| 2010/0207778 A1* | 8/2010 | Haughawout et al. ........ 340/825 |

FOREIGN PATENT DOCUMENTS

| | | |
|---|---|---|
| CN | 1726521 A | 1/2006 |
| KR | 10-1993-0021017 A | 10/1993 |
| KR | 10-2005-0068297 A | 7/2005 |
| KR | 10-2005-0072339 A | 7/2005 |
| WO | 98/59284 A2 | 12/1998 |
| WO | 2004/057551 A2 | 7/2004 |

* cited by examiner

APPARATUS AND METHOD FOR CREATING MACRO COMMAND

CROSS-REFERENCE TO RELATED APPLICATION

This is a divisional of application Ser. No. 11/938,328, now U.S. Pat. No. 7,783,367, filed Nov. 12, 2007. The entire disclosure of the prior application, application Ser. No. 11/938,328 is considered part of the disclosure of the accompanying divisional application and is hereby incorporated by reference. This application claims priority from Korean Patent Application No. 10-2007-0024129 filed on Mar. 12, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate generally to operating a macro command and inputting a macro command, and more particularly to an apparatus and a method for combining control signals received from a remote control to create a macro command, and collectively operating a function corresponding to a menu item of a host device according to the macro command.

2. Description of the Related Art

With the recent development in devices for electronic and digital communications, the various devices, such as a digital television (DTV), an audio video (AV) amplifier, a video cassette recorder (VCR), a digital video disk (DVD) and a set-top box (STB) or the like, have been installed at home. And, when a user watches media contents or the like, a remote control is provided for wirelessly operating these devices or selecting a mode of a desired device.

In general, a separate remote control is provided according to the respective devices so that a user should control the respective devices using a plurality of remote controls. For example, the remote controls for controlling the DVD apparatus and DTV apparatus or the like are provided respectively, and the user controls the corresponding devices using the separate remote controls.

FIG. 1 illustrates controls of the devices by means of a conventional remote control.

As shown in FIG. 1, a home network is formed with a plurality of controlled devices (a DVD player 12, an AV amplifier 14, a STB 16, and DTV 18 in an inner room) and a host device (DTV 10 in a living room). A list of controlled devices is displayed on a screen of the host device 10 so that the user can use a remote control, so as to select one device from the displayed controlled devices and control the selected controlled device. In this way, the user can control the device by means of a single remote control instead of multiple remote controls.

However, the control of the devices by means of a single remote control can be implemented under the network environment in which the devices are manufactured by an identical manufacturer.

Further, even though it is possible to control the devices by means of a single remote control, there is a manipulating complication in that a specific function is accomplished through several steps. For example, if the user desires to play the media contents inserted in the DVD player 12 on the host device 10, the command input procedures to the host device 10 in sequence, i.e., DTV external input conversion, DVD power turn-on, DVD mode selection, DVD play button selection, DVD screen size adjustment, AV receiver power turn-on, AV receiver input conversion, DTV mute, AV receiver sound-field mode or the like, need to be taken follow.

Conventionally, the remote control includes multiple keys, such as a mode conversion key for converting modes among devices, number keys of 0 through 9, a power button, a sound adjustment button, direction buttons including the upper, lower, left and right, a play button, a rewind button and a channel button or the like. In general, users find and press a specific key of the remote control in order to select a device and implement a specific function of the selected device. Therefore, users who are senior or are not familiar with use of the device may feel considerable burdens in manipulating the device.

SUMMARY OF THE INVENTION

Accordingly, the present invention has been made to solve the above-mentioned problems occurring in the prior art, and the present invention provides an apparatus and a method for operating a macro command and inputting a macro command, in which a control signal received from a remote control is combined to create the macro command, and a function corresponding to a menu item of a host device is operated collectively according to the macro command.

Further to the above aspect, the present invention has additional technical aspects not described above, which can be clearly understood by those skilled in the art from the following description.

In accordance with an aspect of the present invention, there is provided an apparatus for operating a macro command, the apparatus including: a storing unit for storing control signals received from a control device in sequence for selecting a menu item of a host device; a creating unit for creating the macro command combined with the control signals; and an executing unit for reading the macro command and executing functions corresponding to respective menu items of the host device based on a combination sequence of the control signals forming the read macro command.

In accordance with another aspect of the present invention, there is provided an apparatus for inputting a macro command, the apparatus including: a host device; a transmitter/receiver for transmitting/receiving the control signals; a storing unit for storing a control signal transmitted to the host device in sequence; a creating unit for creating the macro command combined with the control signal; and an input unit for inputting the macro command to a predetermined button.

In accordance with yet another aspect of the present invention, there is provided a method of operating a macro command, the method including: storing control signals received from a control device for selecting a menu item of a host device in sequence; creating a macro command combined with the control signals; and reading the macro command and executing functions corresponding to respective menu items of the host device based on a combination sequence of the control signals forming the read macro command.

In accordance with still yet another aspect of the present invention, there is provided a method of inputting a macro command, the method including: transmitting/receiving the control signals with a host device; storing a control signal transmitted to the host device in sequence; creating the macro command combined with the control signal; and inputting the macro command to a predetermined button.

Particulars of other embodiments are incorporated in the following description and attached drawings.

BRIEF DESCRIPTION OF THE DRAWINGS

The above and other aspects and features of the present invention will be more apparent from the following detailed description taken in conjunction with the accompanying drawings, in which.

DETAILED DESCRIPTION OF THE EXEMPLARY EMBODIMENTS

Figure 1:
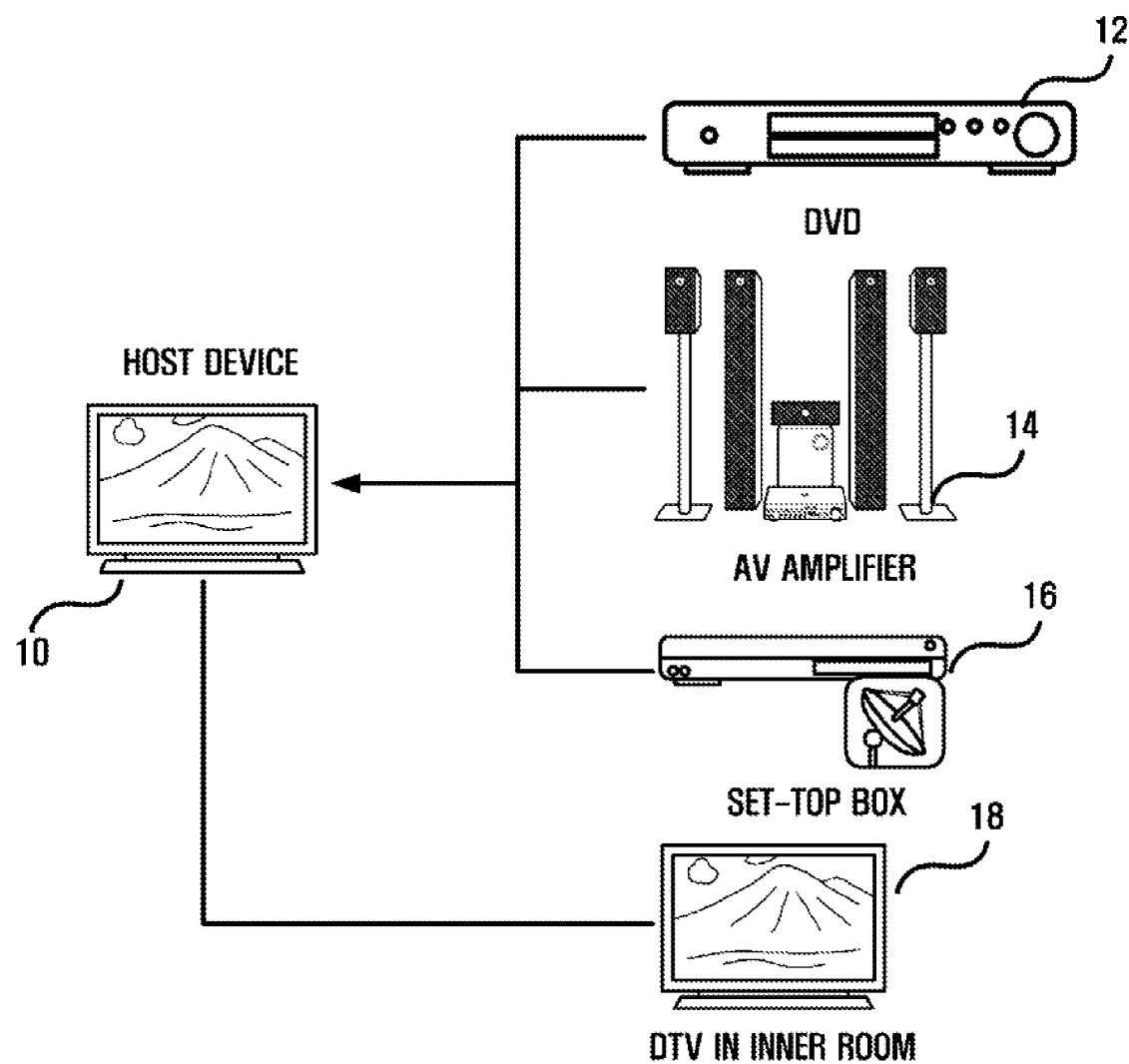
FIG. 1 illustrates the control of a device by means of a conventional remote control.

Aspects and features of the present invention, and ways to achieve them will be apparent from embodiments of the present invention as will be described below together with the accompanying drawings. However, the scope of the present invention is not limited to such embodiments and the present invention may be realized in various forms. The embodiments to be described below are nothing but the ones provided to bring the disclosure of the present invention to perfection and assist those skilled in the art to completely understand the present invention. The present invention is defined only by the scope of the appended claims. Also, the same reference numerals are used to designate the same elements throughout the specification.

Hereinafter, exemplary embodiments of the present invention will be described in detail with reference to attached drawings.

Figure 2A:
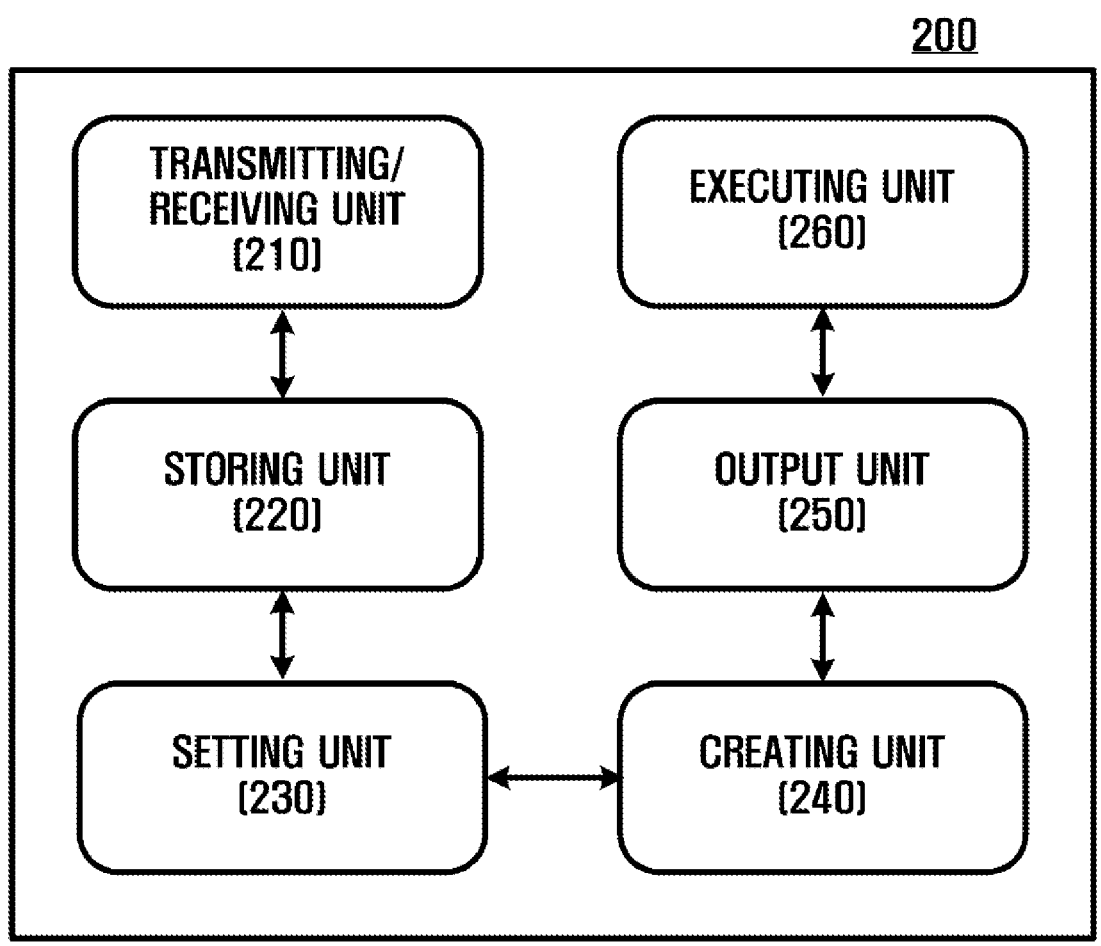
FIG. 2A is a block diagram of an apparatus for operating a macro command according to an exemplary embodiment of the present invention.

FIG. 2A is a block diagram of a macro command operating apparatus 200 according to an exemplary embodiment of the present invention.

Figure 2B:
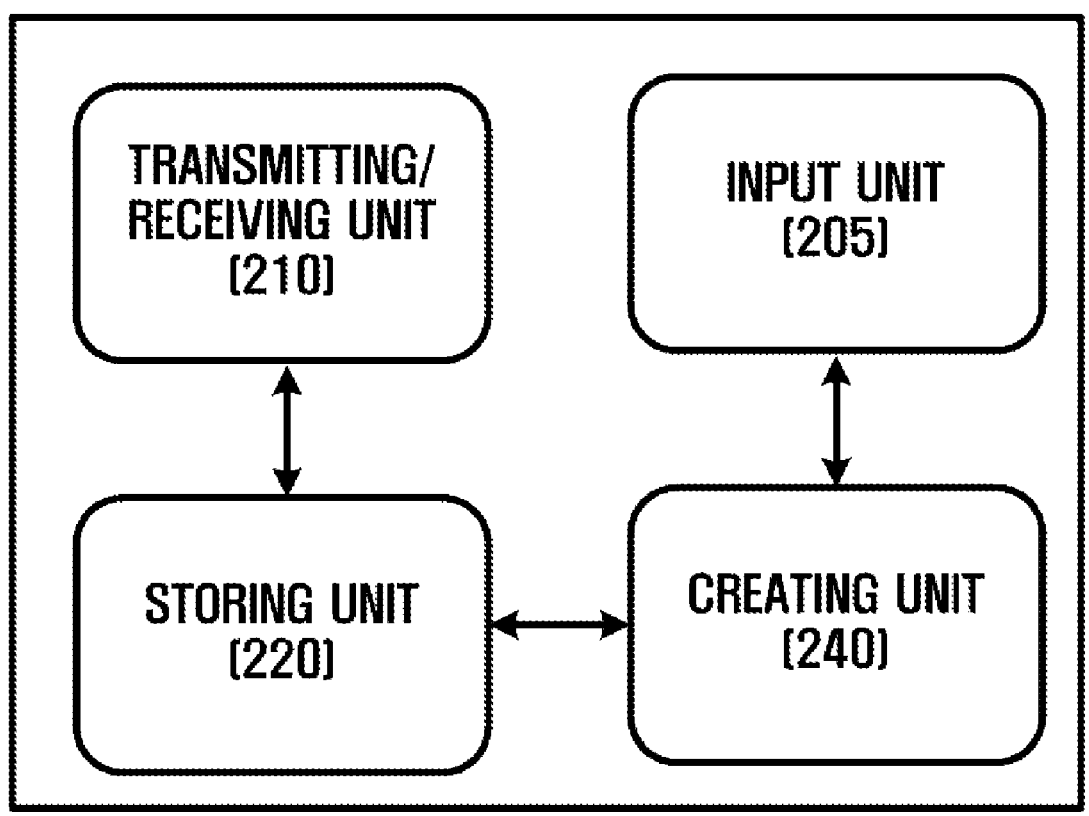
FIG. 2B is a block diagram of an apparatus for inputting a macro command according to an exemplary embodiment of the present invention.

The macro command operating apparatus 200 includes a transmitting/receiving unit 210, a storing unit 220, a setting unit 230, a creating unit 240, an output unit 250 and an executing unit 260. In an exemplary embodiment, the transmitting/receiving unit 210 includes a transmitter and a receiver. The macro command operating apparatus 200 may be implemented on a host device, and as shown in FIG. 2B, some elements of the macro command operating apparatus 200 may be implemented on a control device. In the present invention, the DTV is described as the host device, and the remote control is described as the control device, however, it is not limited to thereto. Therefore, the host device may be a device capable of performing a server role, and the control device may be a device capable of communicating by wire/wirelessly with the host device remotely.

The host device, e.g., a DTV in a living room, can be engaged with the diverse controlled devices, such as an AV amplifier, a VCR, a DVD and a STB or the like by wire or wirelessly. The user can play contents of moving pictures, music and pictures or the like on a screen of the host device by the control device, such as a remote control and a mobile communications terminal. To this end, the user selects the controlled device on the screen of the host device using the remote control and then selects the functions which are provided by the selected controlled device. The remote control can be implemented by using infrared rays, and include the binary code scheme that is different according to manufacturers and product models.

The transmitting/receiving unit 210 transmits and receives the control signal between the host device and the control device. For example, the user transmits the control signal of the remote control to select any one of the displayed controlled devices on the screen of the host device, and then selects any one of the function menu items provided by the selected controlled device. The functions associated with the function menu items are executed by the selected controlled device.

The storing unit 220 stores the values of keys corresponding to the menu item selected in the host device in sequence. At this time, the value of the key can be formed with the control signal of the remote control selecting the respective menu items. Therefore, the value of the key can perform a role of a command, and the menu item corresponding to the value of the key is selected, so that the function of the predetermined controlled device is performed by the executing unit 260 described later. The user can selects a first menu item among a plurality of menu items displayed on the screen of the host device by means of the remote control, selects a second menu item among a plurality of menu items included in the selected first menu item, and selects a third menu item among a plurality of manus included in the selected second menu item. Then, in order to select the respective menu items or functions, the storing unit 220 stores the control signal transmitted from the remote control as the value of the key in sequence. That is, when the user presses a lower direction key of the remote control twice for selecting the first menu item, a lower direction key and a right direction key of the remote control one time respectively for selecting the second menu item, and a lower direction key of the remote control twice for selecting the third menu item, the control signals of the remote control can be stored as a unique value of the key in sequence. For example, the storing unit 220 stores the value of the key corresponding to the first menu item as the 00 value, the value of the key corresponding to the second menu item as 01 value; and the value of the key corresponding to the third menu item as 11 value. For a greater detailed example, if the user selects the set-top box among the controlled devices displayed on the screen of the host device by means of the remote control, and selects a recording function among the function menu items provided by the set-top box, the values of the keys corresponding to the respective selected menu items are stored through the storing unit 220. A unique identification value of the device corresponding to the set-top box and the value of the key corresponding to the recording function menu item of the set-top box are stored in sequence. The storing unit 220 may have a form of, such as a memory chip, a hard disk or the like.

The setting unit 230 determines whether to create the macro command or not, and whether to execute the macro command by the executing unit 260 described later or not. The user can set whether to create the macro command including the combination of the values of the keys or not. The user can determine whether or not to create the macro command combined with the values of the keys corresponding to the menu items selected until the final menu item is selected in the host device. The final menu item is selected by the user pressing the predetermined button or selecting or clicking the setting menu item in the host device. If the user does not create the macro command, a general menu item selection is performed. On the other hand, if the user creates the macro command, the value of the keys corresponding to the respective menu items selected until the user selects the final menu item is created as the macro command by the creating unit 240 described later. Further, the finally selected menu item is composed of the macro menu item to display on the screen by the output unit 250 described later. Whether to create the macro command or not can be set when the initial user communicates with the host device by the remote control, or when the user completes to select the sequential menu item, and then selects the final menu item by the setting unit 230.

Furthermore, when the macro command has been inputted in the key (button) of the remote control by the input unit 205 described later, the user can first determine whether to execute the macro command by the remote control through the setting unit 230 or not. If the execution of the macro command is set by the setting button of the remote control, the button of the remote control to which the macro command is inputted is used for the button for executing the macro command. For example, there may be a button that is normally used for selecting a particular channel, which executes the macro command for playing the DVD if the execution of the macro command is set.

The creating unit 240 creates the macro command combined with the values of the keys stored in sequence. The creating unit 240 combines the 00 value of the key corresponding to the first menu item, 01 value of the key corresponding to the second menu item, and the 11 value of the key corresponding to the third menu item to create one command combination, i.e., the macro command. Therefore, the creating unit 240 creates the macro command in a form of 000111 values. The creating unit 240 can create the macro command by placing a segment symbol between the values of a first key and a second key. The segment symbol may have a form of a comma (,), a dollar sign ($), a semicolon (;) or the like. Besides, the macro command is encrypted to be created or is transformed into the diverse forms of a binary number, a decimal number, a hexadecimal number or the like to be created. When the macro command is encrypted or decoded, an encrypting unit and decoding unit (not shown) is included in the creating unit 240, and which can be easily implemented according to the conventional diverse techniques.

The output unit 250 outputs the created macro command or the macro menu item to the screen. At this time, the macro menu item is the final menu item selected by the user, and denotes menu items designated to the macro. The 000111 values of the described macro command are difficult for the common user to understand, so that the output unit 250 can display the finally selected menu item corresponding to the final path selected by the user by means of the remote control on the screen. For example, the user selects the list of the controlled devices in the host device, the DVD in the list, and a menu item of DVD play in sequence. Then, values of the keys corresponding to the selected menu item are created as the macro command to be stored in the storing unit 220. And the output unit 250 displays the menu item of DVD play, which is the finally selected menu item, on the screen. If the macro command stored by the user is for a multiple number of menu items, a plurality of macro menu items is displayed on the screen. The respective macro menu items have the values of the corresponding macro command. If the user selects the predetermined macro menu item, the values of the keys included in the macro command are executed in sequence by the executing unit 260 described later to select the menu item according to the command corresponding to the value of the key. In addition, when the user inputs arbitrary the predetermined value corresponding to the macro command by a predetermined input window, the corresponding value can be displayed on the screen. That is, the user can name a DVD-PLAY to the macro command corresponding to the finally selected menu item of DVD play, and the output unit 250 designates the name of DVD-PLAY as the macro menu item to display. The output unit 250 includes a module including an image display device having a function of displaying the inputted image signal, such as cathode ray tube (CRT), liquid crystal display (LCD), light-emitting diode (LED), organic light-emitting diode (OLED) or plasma display panel (PDP) or the like.

The executing unit 260 reads the created macro command and executes the command according to the value of the key formed in sequence. The user selects any one of the macro commands displayed through the output unit 250 by means of the remote control. Then, the executing unit 260 reads the macro command corresponding to the selected macro menu item, and executes the command according to the value of the key formed in the read macro command. Therefore, the traditional path in which the user selects the DVD device by means of the remote control in the host device, changes the sound channel of the AV amplifier from two-channel to five-channel and plays the media contents or the like in order to watch the media contents inserted in the DVD device, can be substituted with one-time execution of the macro command. Especially, through the macro menu item, the old, the disabled or the younger can execute the desired function with one-time operation.

FIG. 2B is a block diagram of a macro command input apparatus 203 according to an exemplary embodiment of the present invention.

The macro command input apparatus 203 includes the transmitting/receiving unit 210, the storing unit 220, the creating unit 240, and the input unit 205. The macro command input apparatus 203 can be implemented by the control device capable of communicating with the host device. For example, the mobile communications terminal and the remote control can be used for the macro command input apparatus 203.

The transmitting/receiving unit 210 transmits and receives the control signal with the host device. For example, the user can transmit the control signal of the remote control and select any one of the controlled devices displayed on the screen of the host device.

The storing unit 220 stores the control signal transmitted to the host device in sequence. As shown in FIG. 2A, the control signal transmitted to the host device during the period of selecting from the first menu item to the third menu item is stored by the storing unit 220 in sequence.

The creating unit 240 creates the macro command combined with the control signal. The creating unit 240 can create the macro command of one command combination obtained by combining the 00 value of the key corresponding to the first menu item, the 01 value of the key corresponding to the second menu item, and the 11 value value of the key corresponding to the third menu item. The input unit 205 inputs the macro command to the button of the control device. In case of the remote control, the user can input the macro command to be corresponded to each buttons of the remote control. For example, in case of inputting the macro command of until playing the DVD to a button 1 among the buttons of the remote control, if the user clicks the button 1 of the remote control, the macro command is transmitted to the host device in such a manner that the commands requiring for playing the DVD are automatically executed. In this case, the user can execute the desired function by a simple operation of the remote control though the macro menu item of the output unit 250 is not provided.

Some components of the macro command input device 203 are described in the FIG. 2A. Further, additional components of the FIG. 2A as well as the components of the macro command input device 203 can be included. For example, in the macro command input apparatus 203 capable of displaying, the output unit 250 is added so that the macro command corresponding to the respective keys of the macro command input device 203 is displayed as the macro menu item. In addition, the creating unit 230 determining whether to create the macro command or not can be further included.

The respective components shown in the FIGS. 2A and 2B can include kind of a 'module'. As used herein, the "unit" or "module" refers to a software element or a hardware element, such as a Field Programmable Gate Array (FPGA) or an Application Specific Integrated Circuit (ASIC), which performs a predetermined function. However, the unit or module does not always have a meaning limited to software or hardware. The module may be constructed either to be stored in an addressable storage medium or to execute one or more processors. Therefore, the module includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the modules may be either combined into a smaller number of elements or modules or divided into a larger number of elements or modules.

Figure 3:
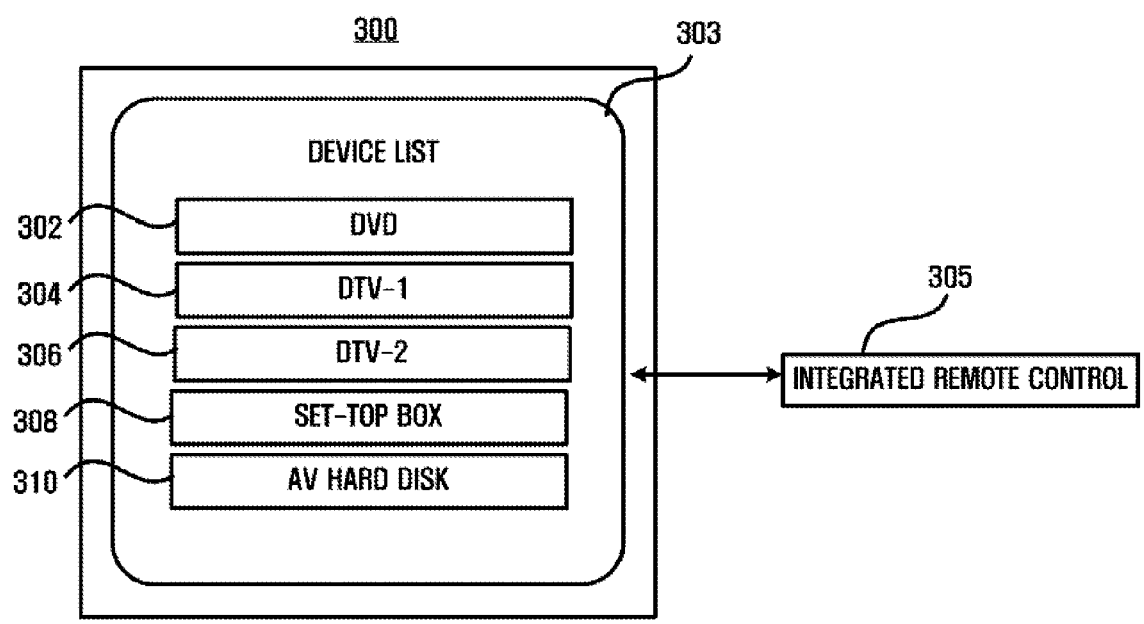
FIG. 3 is a screen of a host device displaying controlled devices according to an exemplary embodiment of the present invention.

FIG. 3 illustrates controlled devices displayed on the host device according to an exemplary embodiment of the present invention.

The user wants to watch the media contents inserted in the DVD device through the screen of the host device 300. Traditionally, the user executes a plurality of procedures of controlling of a peripheral controlled device, e.g., adjusting of the sound channel of the AV amplifier, and converting to the DVD device using an integrated remote control 305 having a function of controlling multiple devices. According to the present invention, the functions of these procedures are automatically executed through simple key operations of the integrated remote control 305. Hereinafter, the more detailed will be described.

First, when the user clicks the predetermined button of the integrated remote control 305 (control device), the controlled devices connected on the network can be represented in a form of a list on the screen 303 of the host device 300. That is, the controlled device connected with the host device 300, such as the DVD device 302, a DTV-1 of a first room 304, a DTV-2 of a second room 306, the set-top box 308, an AV hard disk (HDD) 310 or the like is displayed on the screen 303 of the host device 300. At this time, the name of a model, a mode number or the like of the controlled devices represented on the screen 303 of the host device 300 in a form of the list can be displayed together.

In addition, when the user clicks the predetermined menu item of the host device 300 using the integrated remote control 305, the controlled devices connected on the network as described above can be represented on the screen 303 of the host device 300 in a form of the list.

At this time, the set-top box 308 can provide the user with the function of electronic program guide (EPG), record, time shifting and environment setting or the like. And, the AV hard disk 310 can provide the user with the functions, such as data storage, a bookmark list and contents sharing or the like.

In the next step, the user selects the DVD device 302 in the list.

Figure 4:
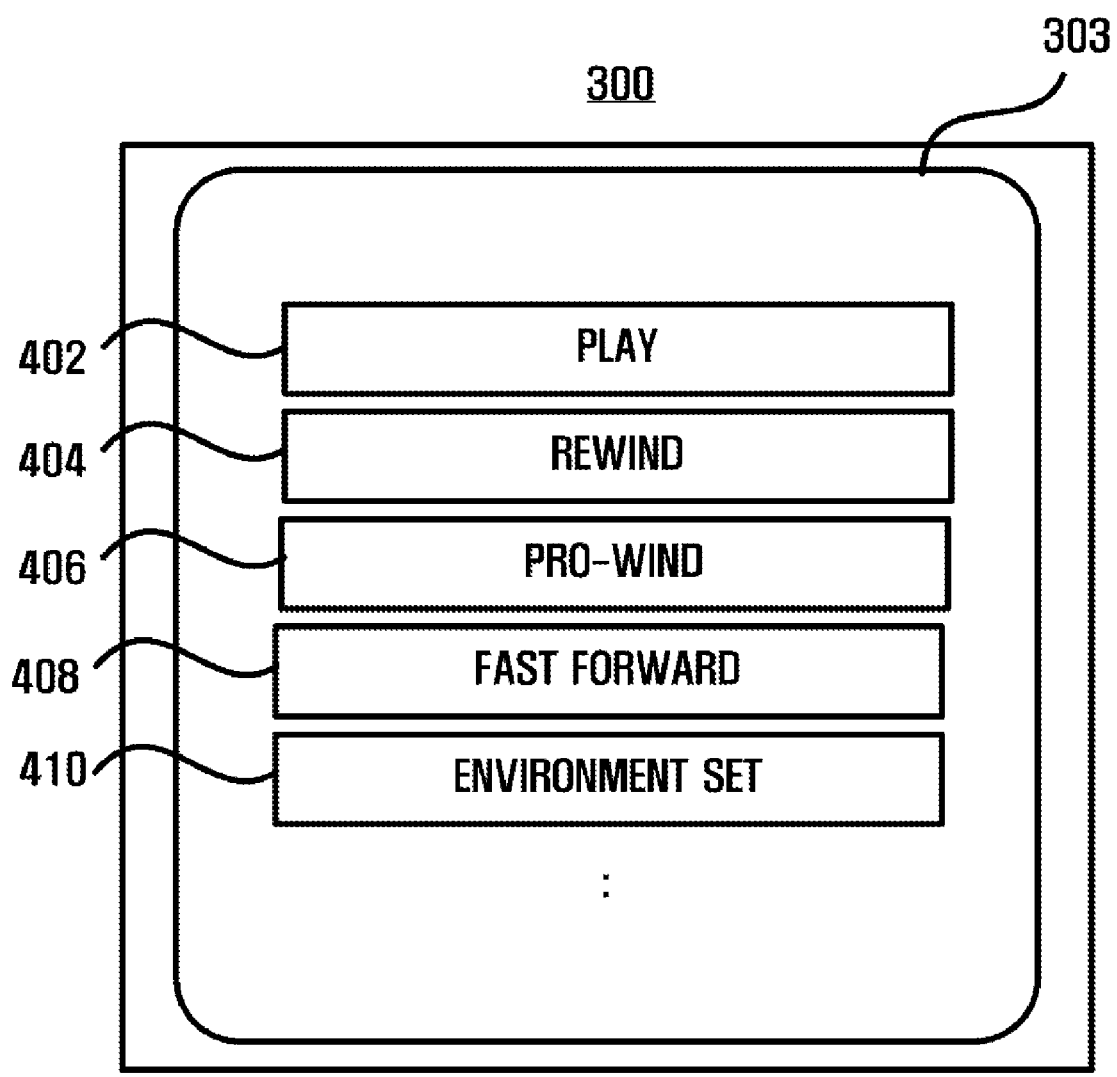
FIG. 4 illustrates menu items of controllable functions of the controlled device according to an exemplary embodiment of the present invention.

As shown in FIG. 4, the controllable functions corresponding to the DVD device 302 can be provided to the user as the menu item on the screen 303 of the host device 300. For example, the functions, such as play 402, rewind 404, prowind 406, fast forward 408, and environment setting or the like can be provided to the user as the menu item. In the next step, the user selects the play 402 menu item.

Figure 5:
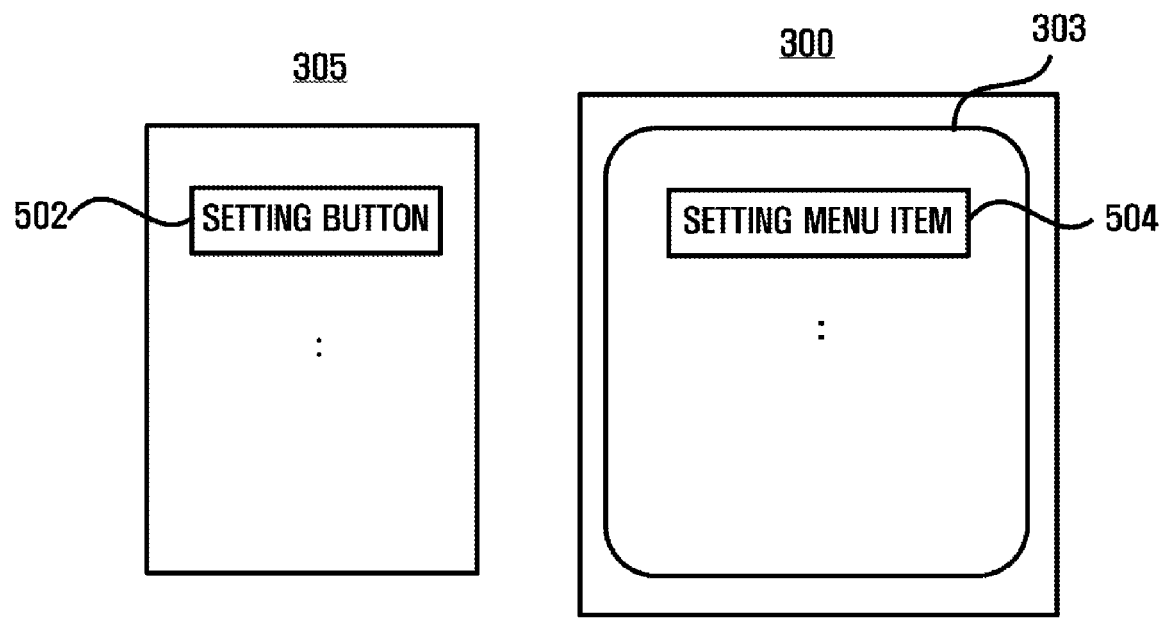
FIG. 5 illustrates setting image for setting the macro command according to an exemplary embodiment of the present invention.

As shown in FIG. 5, in order to create the macro command for the described sequential procedures performed by means of the integrated remote control 305, the user clicks the setting button 502 of the integrated remote control 305. Then, the control signals which the host device 300 receives by reaching to the final menu item selected in the host device 300 at present are combined to create the macro command.

The macro command can be created by the setting menu item 504 of the host device 300. That is, the user selects the setting menu 504 of the host device 300 and stores it, and then, in the sequential procedure until selecting the play menu of the DVD device, the control signals which the host device 300 received from the control device are combined to create the macro command.

At this time, the creation of the macro command can be accomplished by performing the described sequential procedures under the condition of which the user clicks the predetermined button of the integrated remote control 305 to operate the macro function in advance. In like manner, the creation of the macro command can be accomplished by performing the described sequential procedures under the condition of which the user clicks the predetermined menu item of the host device 300 to operate the macro function in advance.

Figure 6:
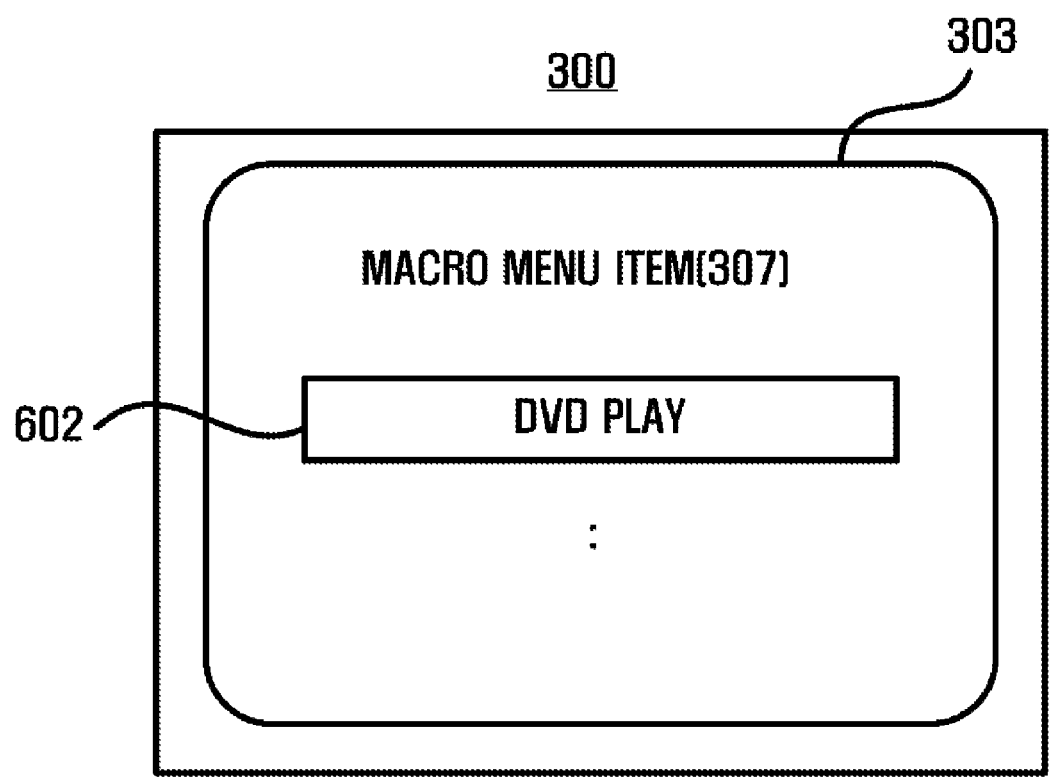
FIG. 6 illustrates a macro menu item according to an exemplary embodiment of the present invention.

Further, as shown in FIG. 6, the user can store the macro command as the name of DVD play 602 in the macro menu item 307 of the host device 300. Then, the stored DVD play 602 is represented in the macro menu item.

The macro menu item 307 is a set of menu items corresponding to the macro command, and can be included the final menu items selected on the screen 303 of the host device 300 by the user.

Therefore, the user can confirm in a convenient manner the command set registered as the macro menu item, and execute the macro command corresponding to the menu item selected by click of the predetermined menu item.

In addition, the user can input the button key executing the command set in the integrated remote control 305. That is, when the key for inputting the macro command in the integrated remote control 305 is selected, the macro command including the command combination is input to the selected key. For example, the user designates number 1 key as the macro key to click the key in the integrate remote control 305, the predetermined macro command is stored in the number 1 key. Thereafter, if the user clicks the number 1 key of the remote control, the macro command corresponding to the number 1 key is transmitted to the host device 300, thereby executing the received macro command.

Figure 7:
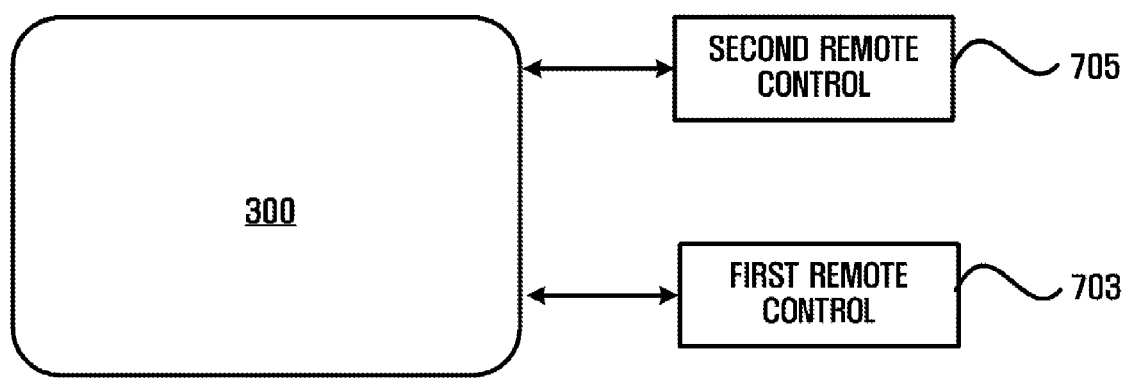
FIG. 7 is a conceptual diagram for creating the macro command combined with control signals received from multiple remote controls according to an exemplary embodiment of the present invention.

In the meantime, as shown in FIG. 7, the host device 300 stores the control signal received from the multiple remote controls in sequence to create the macro command.

That is, the macro function can be applied to the sequential procedure in which the user controls the function of the specific device using the multiple remote controls, as well as the integrated remote control 305.

In the host device 300, the user clicks an external input converting button using a first remote control 703. And, the user converts to the DVD device using a second remote control 705. Further, the user changes the AV amplifier from 2-channel to 5-channel using the first remote control 703, and plays the media contents of the DVD device using the second remote control 705.

These sequential procedures can create the macro command using the above described principle.

As described above, the user can register the control of the predetermined device by means of multiple remote controls as the macro to execute automatically multiple procedures through one macro command. For example, the user clicks the TV guide button by means of the remote control to operate an electronic program guide during watching a broadcast through the set-top box, and selects the predetermined menu item of the electronic program guide to register the procedures executing the corresponding function as the macro function in such a manner that these procedures are conveniently executed through one macro command.

Figure 8A:
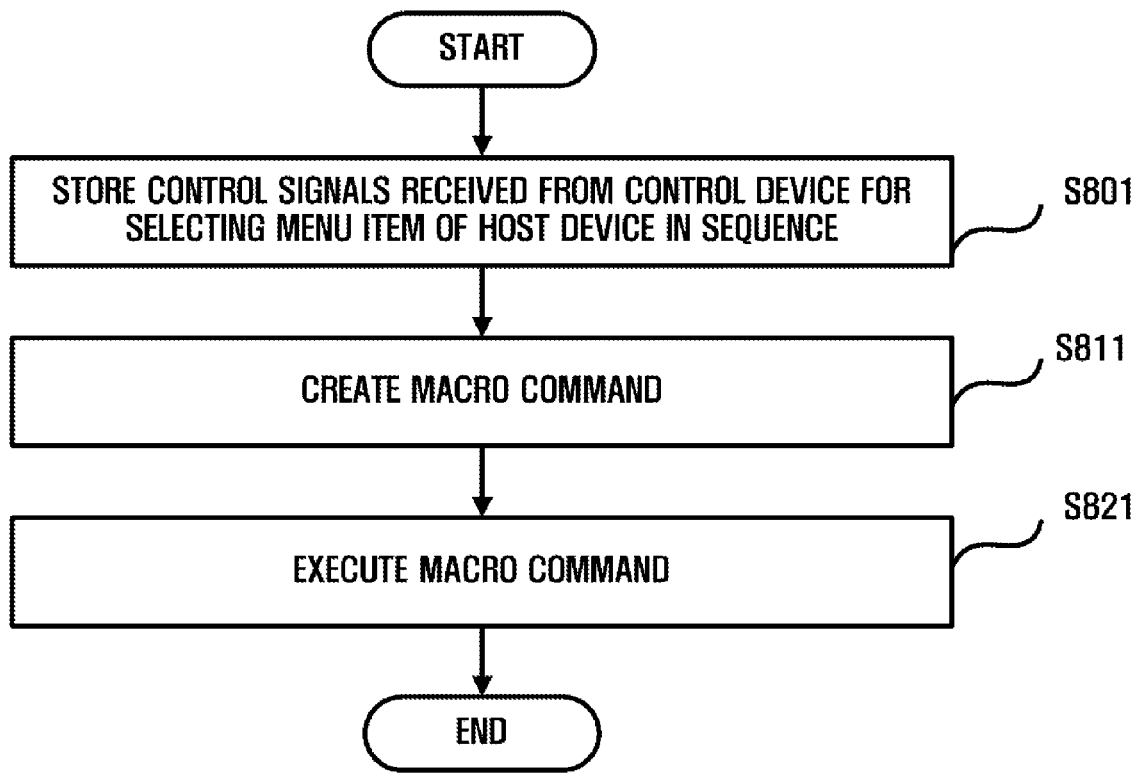
FIG. 8A is a flowchart illustrating a method of operating the macro command according to an exemplary embodiment of the present invention.

FIG. 8A is a flowchart illustrating a method of operating the macro command according to an exemplary embodiment of the present invention.

First, the storing unit 220 stores the control signals received from the control device for selecting the menu item of the host device in sequence S801. When control signals of 00, 01, and 02 are transmitted to each of the host devices, the control signals are stored in the storing unit 220 in the sequence of 00, 01, and 02.

In the next step, the creating unit 240 creates the macro command combined with the control signals.

The executing unit 260 reads the macro command, and executes the functions corresponding to the respective menu item of the host device according to the combination sequence of the control signals forming the read macro command S821. That is, when control signals of 00, 01, and 02 are transmitted to each of the host devices, the macro command can be formed of 000102. 02 is the control signal corresponding to the final menu item selected by the user, when the macro command is executed, it is executed according to the combination sequence of the control signal as the sequence of 00, 01, and 02.

Figure 8B:
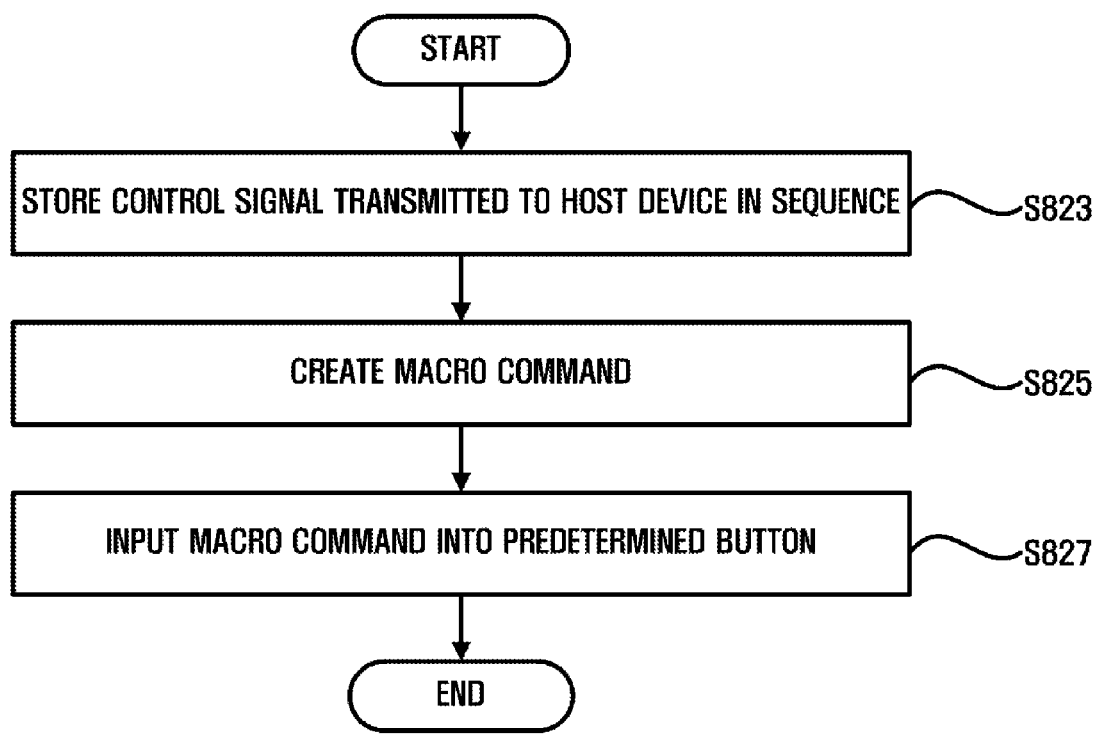
FIG. 8B is a flowchart illustrating a method of remotely controlling using the macro command according to an exemplary embodiment of the present invention.

FIG. 8B is a flowchart illustrating a method of remotely controlling using the macro command according to an exemplary embodiment of the present invention.

First, the storing unit 220 stores the control signal transmitted to the host device in sequence S823.

And, the creating unit 240 creates the macro command combined with the control signal S825.

In the next step, the input unit 205 inputs the macro command to the predetermined button S827. Thereafter, when the button in which the macro command is inputted is pressed, the macro command is transmitted to the host device so that the functions corresponding to the respective menu items of the host device are executed according to the combination sequence of the control signals.

The apparatus and method for operating the macro command and inputting the macro command according to the present invention has one or more aspects as below.

First, the selection of the menu item (function) of the multiple steps to the host device can be executed simply and collectively through one operation.

Second, the user can set the macro command in a convenient manner until reaching the desired menu item.

Finally, the desired function can be executed collectively by one remote control and one-click button instead of multiple remote controls and button operations of the respective remote controls.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments described above should be understood as illustrative not restrictive in all aspects.

What is claimed is:

1. An apparatus for inputting a macro command, the apparatus comprising:
    a transmitting and receiving unit which transmits at least one control signal to a host device to select at least one menu item of the host device;
    a storing unit which stores the at least one control signal transmitted to the host device;
    a creating unit which creates the macro command including the at least one control signal; and
    an input unit which inputs the macro command to a predetermined button,
    wherein the host device displays a list of controlled devices that are controlled by the apparatus and the transmitting and receiving unit transmits said at least one control signal to select one of the displayed controlled devices and wherein the host device displays functions of the selected displayed controlled device and the receiving unit transmits said at least one control signal to select at least one function of the displayed functions of the selected displayed controlled device.

2. The apparatus of claim 1, wherein, if the predetermined button is pressed, the transmitting and receiving unit transmits the macro command corresponding to the predetermined button to the host device.

3. The apparatus of claim 1, further comprising a setting unit which sets whether to create the macro command or not.

4. The apparatus of claim 3, wherein, if the setting unit is set to create the macro command, the creating unit combines a plurality of control signals transmitted to the host device by combining values of keys corresponding to each selected menu item in sequence to create the macro command.

5. A method of inputting a macro command, the method comprising:
    transmitting at least one control signal to a host device to select at least one of menu items of the host device, wherein the menu items comprise a list of controlled devices and wherein the list is displayed on the host device;
    displaying a list of functions for the selected menu item;
    transmitting at least one other control signal to the host device to select at least one function from the list of functions for the selected menu item;
    storing the at least one control signal transmitted to the host device;

creating the macro command including the at least one control signal; and inputting the macro command to a predetermined button.

6. The method of claim 5, wherein, if the predetermined button is pressed, the macro command corresponding to the predetermined button is transmitted to the host device.

7. The method of claim 5, further comprising setting whether to create the macro command or not.

8. The method of claim 7, wherein, if creating the macro command is set, a plurality of the control signals transmitted to the host device are combined by combining values of keys corresponding to each selected menu item in sequence to create the macro command.

* * * * *